(12) United States Patent
Braconnier et al.

(10) Patent No.: US 8,501,124 B2
(45) Date of Patent: Aug. 6, 2013

(54) METHOD FOR RECOVERING RARE-EARTH ELEMENTS FROM A SOLID MIXTURE CONTAINING A HALOPHOSPHATE AND A COMPOUND OF ONE OR MORE RARE-EARTH ELEMENTS

(75) Inventors: Jean-Jacques Braconnier, Andilly (FR); Alain Rollat, Paris (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/264,303

(22) PCT Filed: Apr. 2, 2010

(86) PCT No.: PCT/EP2010/054460
§ 371 (c)(1),
(2), (4) Date: Nov. 30, 2011

(87) PCT Pub. No.: WO2010/118967
PCT Pub. Date: Oct. 21, 2010

(65) Prior Publication Data
US 2012/0070351 A1    Mar. 22, 2012

(30) Foreign Application Priority Data
Apr. 14, 2009 (FR) .................................... 09 01807

(51) Int. Cl.
*C01F 17/00* (2006.01)
(52) U.S. Cl.
USPC ........................................................ 423/21.1
(58) Field of Classification Search
USPC ........................................................ 423/21.1
See application file for complete search history.

(56) References Cited

U.S. PATENT DOCUMENTS

| 5,160,663 A | 11/1992 | Dutta et al. |
| 2009/0162267 A1 | 6/2009 | Otto et al. |

FOREIGN PATENT DOCUMENTS

| DE | 246 551 A1 | 6/1987 |
| DE | 292217 A * | 7/1991 |
| DE | 199 18 793 A1 | 11/2000 |
| DE | 19918793 A1 * | 11/2000 |
| EP | 0 157 249 A | 10/1985 |
| EP | 335280 A1 * | 10/1989 |
| FR | 2 864 861 A | 7/2005 |
| JP | 54118998 A * | 9/1979 |
| JP | 04276034 A * | 10/1992 |
| WO | WO 2006111568 A2 * | 10/2006 |
| WO | 2007/141177 A | 12/2007 |

OTHER PUBLICATIONS

International Search Report (PCT/ISA/210) issued on Aug. 4, 2010, by European Patent Office as the International Searching Authority for International Application No. PCT/EP2010/054460.

* cited by examiner

*Primary Examiner* — Melissa Stalder
(74) *Attorney, Agent, or Firm* — Dentons US LLP

(57) ABSTRACT

A method is described for recovering rare earth elements from a solid mixture including a halophosphate and at least one compound of one or more rare earth elements. The method includes: (a) acid etching the mixture; (b) adding a base to bring the pH back up to a value of at least 1.5; (c) etching the solid from step (b) with a solution of soda or potash; (d) acid etching the solid from step (c) until a pH of less than 7 is obtained, resulting in a solid phase and a liquid phase including at least one rare earth salt, and separating the solid phase from the liquid phase.

10 Claims, 1 Drawing Sheet

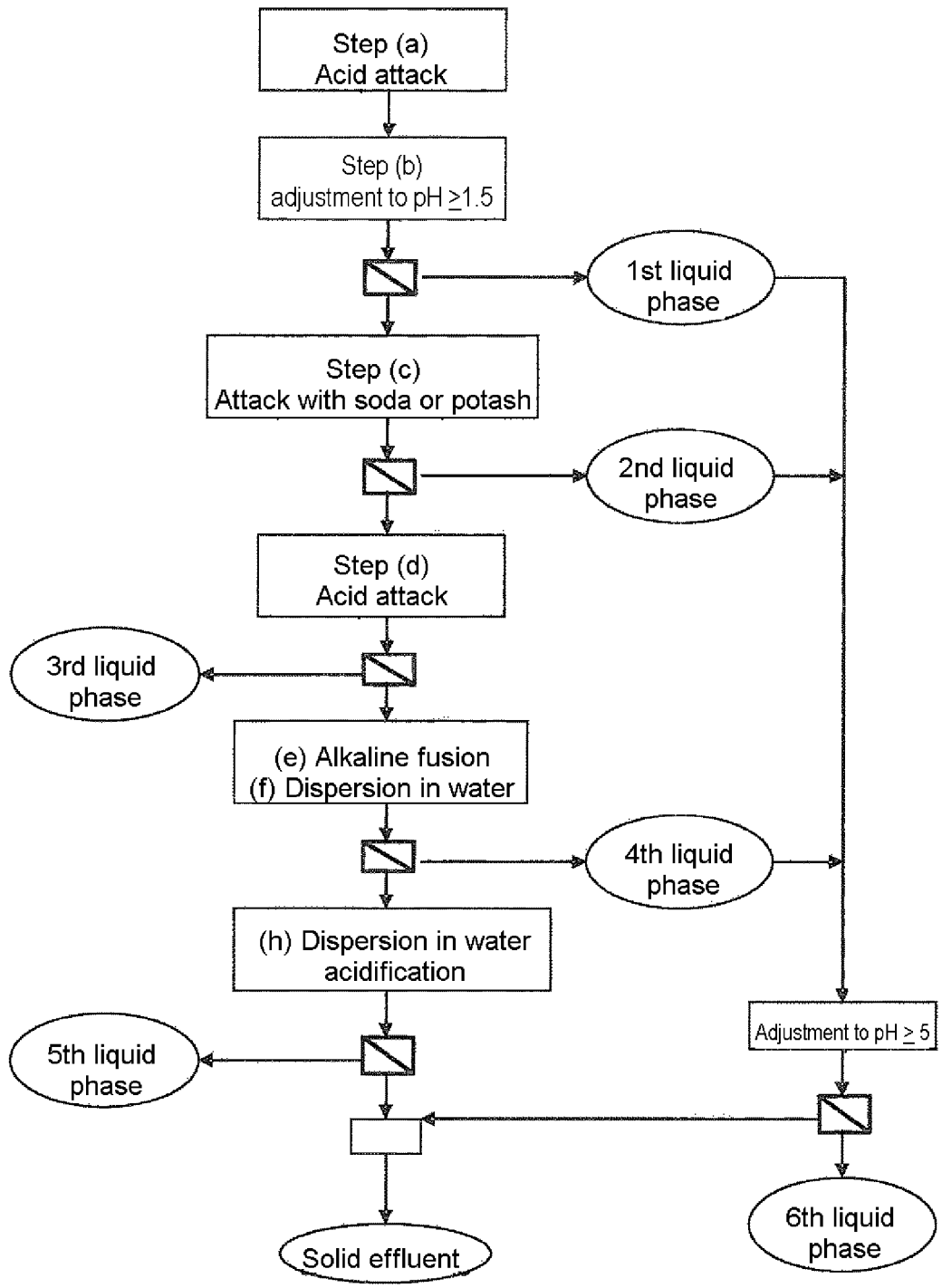

METHOD FOR RECOVERING RARE-EARTH ELEMENTS FROM A SOLID MIXTURE CONTAINING A HALOPHOSPHATE AND A COMPOUND OF ONE OR MORE RARE-EARTH ELEMENTS

This application is the United States national phase of PCT/EP2010/054460, filed Apr. 2, 2010, and designating the United States (published in the French language on Oct. 21, 2010, as WO 2010/118967 A1; the title and abstract were also published in English), which claims foreign priority under 35 U.S.C. §119 of FR 0901807, filed Apr. 14, 2009, each hereby expressly incorporated by reference in its entirety and each assigned to the assignee hereof.

The invention relates to a method of recovering rare-earth elements from a solid mixture containing a halophosphate and a compound of one or more rare-earth elements.

The market for energy-saving lamps is now expanding rapidly. It is known that lighting is in fact a major item in the energy bill of industrialized countries and that using these lamps instead of incandescent lamps will make it possible to reduce its level.

Government directives issued in several countries will reinforce this trend toward energy-saving lamps.

Moreover, development of lamps of this type makes it imperative to manage their recovery and recycling, taking into account not only the presence of mercury, but also of the metals included in their composition.

At present, almost all the materials (glass, mercury, metals, etc.) resulting from the processing of lamps of this type are recycled, reaching a level of recycling above 90%. Only the fluorescent powders, representing 1-4 wt. % of the lamps, are currently buried at approved landfill sites, after removal of mercury.

These fluorescent powders comprise one or more luminophores as well as additives for improving the performance of the lamps (alumina, calcium phosphate or borate etc.).

Now, the luminophore compounds present in these powders are materials which are expensive to produce, and which contain expensive rare elements, such as rare-earth elements.

There is therefore a great need for a method that would allow the various components of these powders to be separated, so that they can then be reprocessed separately.

The method of the invention meets this need.

With this aim, the method of the invention is a method of recovering rare-earth elements from a solid mixture containing at least one halophosphate and at least one compound of one or more rare-earth elements, and it is characterized in that it comprises the following steps:

(a) acid attack is carried out on said mixture in a liquid medium;

(b) a base is added to the medium obtained at the end of step (a) so as to raise the pH of said medium to a value of at least 1.5, whereby a first solid phase is obtained comprising one or more rare-earth elements at least partly in the form of phosphate and a first liquid phase comprising at least one alkaline-earth element of the halophosphate and the first solid phase is separated from the first liquid phase;

(c) the solid resulting from step (b) is attacked with a strong base, whereby a second solid phase is obtained comprising one or more rare-earth elements at least in the form of hydroxide and a second liquid phase comprising a phosphate of the cation of the strong base and the second solid phase is separated from the second liquid phase;

(d) acid attack of the solid resulting from step (c) is carried out in conditions such that the pH of the reaction mixture is below 7, giving a third solid phase and a third liquid phase comprising at least one rare-earth salt and the third solid phase is separated from the third liquid phase.

The method of the invention is a simplified method which gives a high yield in recovery of the rare-earth elements, which can notably be at least 75% or even at least 80%.

Moreover, according to a particular embodiment, this method gives rise to a solid effluent that can be utilized and to a liquid effluent that is acceptable, taking into account the environmental constraints.

Other characteristics, details and advantages of the invention will become clearer on reading the description given hereunder, referring to the appended drawing in which:

the single FIGURE is a block diagram of the method of the invention.

For the present description, "rare-earth elements" means the elements of the group consisting of yttrium and the elements of the periodic table with atomic number between 57 and 71 inclusive.

It should also be noted that hereinafter, unless stated otherwise, in all the ranges or limits of values that are given, the values at the limits of the range are included, the ranges or limits of values thus defined therefore covering any value at least equal to or greater than the lower limit and/or at most equal to or less than the upper limit.

The method of recovery of the invention starts from a mixture in the solid form which notably contains at least one halophosphate and at least one compound of one or more rare-earth elements.

The method of the invention can be applied particularly well to a mixture resulting from processing for recovery or recycling of lamps, for example fluorescent tubes, linear, compact, trichomatic or halogen lamps, said processing having already recovered, at least partly, materials such as glass, mercury or other metals.

This mixture is generally in the form of a powder whose granulometry can vary notably between 1 μm and 10 μm, more particularly between 3 μm and 10 μm and whose density can be for example between 3 and 5.

A first type of halophosphate present in the starting mixture is a luminophore used in the lamps for its white color of emission. It is generally of a compound of the apatite type, i.e. a compound which is a mixture of a calcium phosphate and of another salt of this element and which can also comprise halogens such as fluorine or chlorine. We may mention as examples hydroxyapatite $Ca_{10}(PO_4)_6(OH)_2$, chloroapatite $Ca_3(PO_4)_2CaCl_2$, fluoroapatite $Ca_5(PO_4)_3F$. As is known, the compounds of this type can further comprise another alkaline-earth element such as strontium partially replacing calcium, doping elements of the transition element type such as antimony or manganese or of the rare earth type. As an example, we may mention a compound represented by the general formula $(Sr,Ca)_{10}(PO_4)_6(Cl,F)_2:Sb^{3+},Mn^{2+}$.

As another type of halophosphate, we may mention the products of the phosphate type comprising a halogen, an alkaline-earth element and a rare-earth element such as europium for example. We may mention, as an example of a compound of this type, the compound of formula $Sr_5(PO_4)_3Cl:Eu^{2+}$. These halophosphates are generally used for their blue color of emission.

The solid starting mixture further comprises a compound of one or more rare-earth elements.

These compounds can be of various kinds. They can be selected more particularly from phosphates, alkaline-earth aluminates, borates, vanadates and oxides of rare-earth elements.

For the phosphates, we may mention more particularly the phosphates of cerium or of terbium or of a combination of these two rare-earth elements. They can also be phosphates of lanthanum in combination with at least one of the two aforementioned rare-earth elements and they can also be quite particularly phosphates of lanthanum, of cerium and of terbium. These phosphates are generally orthophosphates, which can be represented by the general formula $LnPO_4$, with Ln denoting at least one rare-earth element such as lanthanum, cerium and terbium. They are notably luminophores used for their emission in the green.

For the aluminates, they are alkaline-earth aluminates, the alkaline-earth metal being more particularly magnesium, barium, calcium or strontium, alone or in combination. They are generally products used in lamps for their emission in the blue or the green.

The rare-earth element, which can be present as element of the matrix or as dopant, can notably be cerium, terbium, europium, neodymium and dysprosium, these elements being used alone or in combination.

Thus, barium can be partially substituted with at least one element selected from strontium, calcium or rare-earth elements other than europium. Moreover, magnesium can be partially substituted with at least one element selected from zinc or manganese or cobalt. Finally, aluminum can also be partially substituted with at least one element selected from gallium, scandium, boron, germanium or silicon.

Purely as an example, we may mention aluminates of the following formulas: $BaMgAl_{10}O_{17}:Eu^{2+}$ or $(Ce,Tb)MgAl_{11}O_{19}$.

The borates of rare-earth elements can be orthoborates of formula $LnBO_3$, Ln representing at least one rare-earth element or oxyborates of rare-earth elements of formula $Ln_3BO_6$. It is known that in these borates the rare-earth element can be present as element of the borate matrix, in this case the rare-earth element can notably be lanthanum, lutecium, yttrium and gadolinium or a combination of at least two of these rare-earth elements but also as a doping element. In the latter case, the rare-earth element can be more particularly europium, samarium, thulium and ytterbium, these elements being used alone or in combination. The doping rare-earth element can also be present in combination with a second dopant such as bismuth, lead, antimony, chromium and iron.

As an example of borate, we may mention a product of formula: $(Gd,Mg)B_5O_{10}:Ce^{3+},Tb^{3+}$.

The rare-earth elements can also be present in the form of vanadates, doped with a rare-earth element such as europium. We may thus mention the compounds $YVO_4:Eu$ or $Y(P,V)O_4:Eu$.

Finally, the compound of rare-earth element of the starting mixture can be a rare-earth oxide of general formula $Ln_2O_3$. We may mention more particularly yttrium oxide ($Y_2O_3$) or gadolinium oxide ($Gd_2O_3$) or the mixed oxide of yttrium and gadolinium ($(Y,Gd)_2O_3$). These oxides of yttrium and/or of gadolinium are generally doped with europium and they can optionally contain other additional elements selected from the rare-earth elements other than europium, gadolinium and yttrium. We may notably mention terbium, samarium or lanthanum. Such oxides are generally used in lamps for their red emission.

The solid starting mixture can moreover contain compounds such as alumina $Al_2O_3$, silica $SiO_2$, calcium phosphates and other residues resulting from processing of the lamps such as metals such as mercury or plastics or glass debris.

The relative proportions of halophosphate and of compounds of rare-earth elements can vary widely depending notably on the type of lamp from which the mixture to be treated was obtained. The method of the invention can be applied quite particularly to mixtures that have a content of at most about 80 wt. % of halophosphate, but this value is not critical and is only given as an example.

The various steps of the method of the invention will now be described in detail and reference may be made, in the rest of the description, to the appended drawing in which these steps are shown schematically.

The first step of the method of the invention, step (a), is acid attack of the solid mixture, which has just been described.

This attack is carried out in a liquid medium. Thus, a dispersion of the solid mixture in water can be prepared and the resultant dispersion is brought in contact with an acid. This can be carried out in a stirred reactor containing the dispersion, introducing a solution of acid into the reactor.

The acid is preferably a strong acid such as nitric acid or hydrochloric acid.

Acid attack is preferably carried out hot, for example at a temperature between 40° C. and 80° C.

Generally attack is carried out until the pH in the reaction mixture is less than or equal to 1.

Once the pH is reached after adding the necessary amount of acid, it may be advantageous to carry out maturation of the reaction mixture by holding it in the same conditions of pH and of temperature as at the end of attack, optionally with stirring.

The second step of the method, step (b), comprises adding a base to the medium obtained at the end of step (a), optionally holding the medium at the same temperature that it was at before introduction of the base.

It is preferable to use a base of the alkali-metal hydroxide type such as soda. The base is added in such a way that the pH of the reaction mixture rises to a pH of at least 1.5, more particularly of at least 2.

After adding the base and, preferably, cooling the reaction mixture, the phases of the reaction mixture are separated by any suitable method of solid/liquid separation, for example filtration, centrifugation, decanting.

At the end of this separation, a first solid phase and a first liquid phase are collected. Washing of the solid phase with water can be carried out.

The first solid phase comprises the rare-earth element or elements of the solid starting mixture. This rare-earth element or these rare-earth elements are at least partly in the form of phosphate, notably orthophosphate. The solid phase can in fact contain one or more rare-earth elements in another form, for example in the form of aluminates and, optionally and in residual amounts, borates or oxides, notably depending on the composition of the solid starting mixture, these forms corresponding to rare-earth compounds that were not attacked during the first step of acid attack. Finally, this solid phase can in addition contain other compounds such as alumina or silica.

The first liquid phase comprises at least one alkaline-earth element which is the alkaline earth of the starting halophosphate, notably calcium or strontium in the form of a solution, generally aqueous, of the salt of the acid used during acid attack.

This liquid phase can either be removed as liquid effluent from the process, or it can be further treated subsequently according to a variant of the method which will be described later.

The next step of the method of the invention, step (c), is attack of the solid (first solid phase) resulting from step (b) with a strong base, which more particularly can be a solution of soda or of potash.

This attack is carried out by bringing the strong base in the form of solution in contact with the solid, with stirring. The mixture obtained is heated to a temperature of at least 100° C., more particularly of at least 120° C., for a time that can vary between 30 min and 2 h for example, said time being shorter, the higher the temperature of the mixture.

At the end of attack, it is possible to dilute the reaction mixture by adding water to lower its viscosity, if necessary.

The medium is then submitted to separation of the solid and liquid phases, once again by any known means, for example by filtration.

At the end of this separation, a second solid phase and a second liquid phase are collected. Washing of the solid phase with water can be carried out.

This second solid phase comprises one or more rare-earth elements, at least a proportion of which is in the form of hydroxide $Ln(OH)_3$, Ln representing at least one rare-earth element.

Still notably depending on the composition of the solid starting mixture, the solid phase can contain one or more rare-earth elements in another form, for example in the form of aluminates and, optionally and in residual amounts, borates or phosphates corresponding to rare-earth compounds that were not attacked during the first step of acid attack, as well as other compounds such as alumina or silica.

The second liquid phase comprises compounds such as phosphate of the cation of the strong base used for the attack in step (c), for example such as sodium phosphate or potassium phosphate. It can optionally contain silicate of this cation such as sodium silicate or potassium silicate.

This liquid phase can either be removed as another liquid effluent from the process or also treated subsequently according to a variant of the method which will be described later.

The next method comprises a step (d) of treatment of the solid resulting from the preceding step (second solid phase) optionally after washing the latter with water.

This treatment is an acid attack. The solid can thus be dispersed in water and an acid is added to the dispersion thus obtained.

The acid is preferably a strong acid such as nitric acid or hydrochloric acid.

The acid attack is carried out by adding the acid in conditions such that the pH of the reaction mixture is below 7, preferably below 3, for example equal to 1.

According to an interesting variant, the dispersion or the medium resulting from this acid attack is heated, for example up to its boiling point and it is held at this temperature and at the starting pH for a period of time which can for example be equal to 1 h.

This variant can be applied by autoclaving the dispersion or the medium at a temperature which can be up to 200° C. for example.

The solid and liquid phases of the medium obtained at the end of acid attack are separated by any known means.

At the end of this separation, a third solid phase and a third liquid phase are collected. Washing of the solid phase with water can be carried out.

The liquid phase comprises at least one salt of one or more rare-earth elements and of the acid used for acid attack in step (d), for example a nitrate or a chloride. This liquid phase constitutes the output of the method of recovery of the invention since it contains the rare-earth element or elements present in the solid starting mixture. In the case of a mixture of rare-earth elements, these can be separated for example by known methods of the liquid/liquid extraction type.

The solid phase recovered contains all the species that were not attacked, for example alumina or silica, and it constitutes the solid residue of the process.

According to a particular embodiment, which will now be described, the method of the invention can comprise additional steps.

This embodiment is employed depending on the composition of the solid starting mixture. Thus, it is particularly useful if this mixture contains compounds such as aluminates of alkaline-earth metals and of rare-earth elements and notably aluminates that comprise magnesium.

According to this embodiment, the method therefore comprises the following additional steps:

(e) mixing the solid resulting from step (d) described above with a solid alkaline compound and calcining the mixture thus obtained;

(f) the calcined product from the preceding step is redispersed in water;

(g) separating, from the dispersion obtained at the end of the preceding step, a fourth solid phase comprising one or more rare-earth elements at least in the form of hydroxide and a fourth liquid phase comprising at least one alkaline element;

(h) preparing an aqueous dispersion of the solid resulting from the preceding step and acidifying the dispersion thus obtained;

(i) separating, from the dispersion obtained at the end of the preceding step, a fifth solid phase and a fifth liquid phase comprising at least one rare-earth salt.

Step (e) is a step of solid/solid reaction (alkaline fusion) in which the solid resulting from step (d) is mixed with an alkaline compound, which can be for example a hydroxide, such as NaOH, an oxide such as NaO, and more particularly a carbonate, even more particularly a sodium carbonate. Mixing is carried out with a proportion by weight of alkaline compound generally in excess relative to the solid to have an optimum reaction, and said proportion can be for example at least 3 parts of alkaline compound to 1 part of solid, notably 5 parts of alkaline compound to 1 part of solid.

Calcination is carried out in a furnace at a sufficient temperature to obtain fusion of the mixture, for example at a temperature of at least 900° C. The duration of this calcination can be, just as an example, between 1 and 4 h.

At the end of calcination, the solid obtained is cooled and is dispersed in water, for example hot water, preferably with stirring, so as to obtain a dispersion.

The solid and liquid phases of the dispersion are then separated by any known means, notably by filtration, whereby a fourth solid phase and a fourth liquid phase are obtained.

The solid phase, which can be washed with water, contains one or more rare-earth elements, which are generally present in the form of hydroxides $Ln(OH)_3$, as well as residues of the alumina or silica type.

The liquid phase comprises an alkaline element which is that of the solid compound used in step (e), this alkaline element generally being in the form of a hydroxide for example NaOH, an aluminate for example $NaAlO_2$ or a silicate such as $Na_2SiO_3$.

This liquid phase can either be removed as liquid effluent from the process or further treated subsequently according to a variant of the method which will be described later.

In order to recover the rare-earth element or elements contained in the solid residue resulting from step (g) (fourth solid phase) this solid is dispersed in water and the dispersion thus obtained is acidified.

This acidification can be carried out with a strong acid, for example with nitric acid or hydrochloric acid. Acidification is carried out by adding the acid until a pH in the reaction mixture of less than 7 is obtained, preferably of at most 3, for example equal to 1.

According to an interesting variant, the dispersion or the medium resulting from acidification is heated, for example up to its boiling point, and it is held at this temperature and at the starting pH for a period of time, which can for example be equal to 1 h.

The solid and liquid phases of the medium obtained are then separated by any known means, notably by filtration, whereby a fifth solid phase and a fifth liquid phase are obtained.

The solid phase recovered contains species that were not attacked, for example alumina or silica.

The liquid phase also constitutes an output of the method of recovery of the invention, since it contains the rare-earth element or elements that were still present in the solid obtained at the end of step (d). In the case of a mixture of rare-earth elements, separation of the latter can once again be effected by known methods of the liquid/liquid extraction type.

An interesting variant of the method of the invention will now be described, which relates to the treatment of the liquid phases obtained in the various steps that were described above.

According to this variant, the first and second liquid phases mentioned above and, if applicable, the fourth liquid phase if steps (e) to (g) were employed, are mixed together. The pH of the mixture thus obtained is adjusted to at least 5, more particularly at least 7, notably between 7 and 8, whereby a precipitate is obtained in a sixth liquid phase, then the precipitate is separated from this sixth liquid phase.

The pH is adjusted to the value stated above by adding a basic or acid solution to the mixture in relation to the respective amounts of the various liquid phases that were used to form the mixture.

The precipitate obtained can be mixed with the solid phase recovered at the end of step (d) or step (i).

This variant can be particularly interesting when hydrochloric acid is used for the acid attack in step (a), a solution of soda is used in step (c) and if, when step (e) is applied, a compound of sodium is used during the latter. In this case, in fact a precipitate is obtained, which constitutes the solid effluent of the process and comprises a hydroxyapatite, and a sixth liquid phase which constitutes the liquid effluent of the process and which comprises sodium chloride. The hydroxyapatite of type $Ca_{10}(PO_4)_6(OH)_2$ is a solid that can be utilized.

It should be noted that at the end of the method according to this variant, there is only recovery of a solid that can be utilized and a liquid effluent whose treatment does not pose any major problem, which makes this method advantageous from an environmental standpoint.

Non-limiting examples will now be given.

EXAMPLE 1

This example concerns a method according to the invention in which nitric acid is used for the operations of acid attack.

As starting mixture, it starts from a powder of luminophores which has, per 100 g, the following composition expressed in oxides of the various elements:

TABLE 1

| | |
|---|---|
| $Eu_2O_3$ | 1 g |
| $Gd_2O_3$ | 2 g |
| $CeO_2$ | 2 g |
| $Y_2O_3$ | 22 g |
| $La_2O_3$ | 1 g |

TABLE 1-continued

| | |
|---|---|
| $Tb_4O_7$ | <1 g |
| $Al_2O_3$ | 7 g |
| CaO | 35 g |
| BaO | 1 g |
| MnO | 1 g |
| $Sb_2O_3$ | 1 g |
| $P_2O_5$ | 27 g |

Attack Acid

In a stirred reactor, the powder of luminophores is dispersed in water, to obtain a dispersion with a concentration of 170 g/l, which is heated to a temperature 70° C. A solution of nitric acid is poured onto this dispersion, which is stirred and heated, in 1 h until the solution pH remains below 1. The mixture is then left to digest for 1 h, with stirring, and it is kept at the same temperature and at the same pH.

Then a solution of soda with a concentration equal to 4N is added in 1 h to the mixture, so that the pH of the mixture increases to 2. The mixture is stirred for 1 h.

After cooling, the mixture is filtered, and the filtration water is recovered. It has the following composition:

TABLE 2

| | |
|---|---|
| $Al_2O_3$ | 1 g |
| CaO | 25.8 g |
| MnO | 0.5 g |
| $P_2O_5$ | 5 g |
| MgO | 0.5 g |
| $SiO_2$ | 7.2 g |
| SrO | 0.5 g |
| ZnO | 0.013 g |
| $B_2O_3$ | 2.3 g |
| $Na_2O$ | 11.6 g |

The residual solid, washed on the filter, is then recovered.

Attack with Soda

A soda solution at 55% and the preceding wet solid are added to a stirred stainless-steel reactor. The amount of soda is such that the NaOH/solid weight ratio is equal to 3. The mixture is heated to a temperature of 140° C. for 45 min. Then after cooling to 80° C., the mixture is diluted by adding hot water at 60° C.

Finally, after the mixture has cooled to 50° C., it is filtered, and the mother liquor is recovered.

The solid residue is washed on the filter, then it is recovered and is redispersed in pure water in a stirred reactor.

Acid Attack

Then a solution of nitric acid is added, until a pH of 1 is obtained at 60° C. The mixture obtained is filtered, and the mother liquor, containing the nitrates of rare-earth elements, is recovered for a subsequent treatment of separation of the rare-earth elements by liquid/liquid extraction.

The content of rare-earth elements expressed in oxide of this mother liquor is presented below.

TABLE 3

| | |
|---|---|
| $Eu_2O_3$ | 0.92 g |
| $Gd_2O_3$ | 2.3 g |
| $CeO_2$ | 0.46 g |
| $Y_2O_3$ | 16.8 g |
| $La_2O_3$ | 0.46 g |
| $Tb_4O_7$ | 0.46 g |
| Total | 21.4 g |

Alkaline Fusion

The solid residue, after washing on the filter, is mixed with sodium carbonate $Na_2CO_3$, in a weight ratio of 5 parts of carbonate to one part of residue. The mixture, placed in a crucible, is introduced into a furnace for calcining at a temperature of 950° C. for 3 h. The fused solid obtained after cooling is disintegrated in hot pure water at 80° C. so as to obtain a dispersion of 100 g/l of starting residue, and is then stirred for 1 h. After cooling, the dispersion is filtered, and the mother liquor is recovered.

Dispersion/Acidification

The solid obtained, after washing on the filter, is dispersed in pure water. The dispersion is acidified by adding nitric acid, to pH 1, then boiled for 1 h, keeping the pH at 1.

After cooling, the dispersion is filtered, and the mother liquor, containing the nitrates of rare-earth elements, is recovered for subsequent treatment of separation of the rare-earth elements by liquid/liquid extraction.

The content of rare-earth elements expressed in oxide this mother liquor is presented below.

TABLE 4

| | |
|---|---|
| $Eu_2O_3$ | 0.22 g |
| $Gd_2O_3$ | 0.35 g |
| $CeO_2$ | 0.416 g |
| $Y_2O_3$ | 1.85 g |
| $La_2O_3$ | 0.128 g |
| $Tb_4O_7$ | 0.22 g |
| Total | 3.184 g |

The overall yield for the rare-earth elements is 87.8%.

EXAMPLE 2

This example concerns a method according to the invention in which hydrochloric acid is used for the first acid attack on the powder of luminophore. The next steps of the method are carried out in the same way as in example 1.

The tables given below show the analyses of the filtration water recovered at the end of the first acid attack (Table 5) and of the second acid attack (Table 6).

TABLE 5

| | |
|---|---|
| $Al_2O_3$ | 0.3 g |
| CaO | 29.4 g |
| MnO | 0.73 g |
| $Sb_2O_3$ | 0.012 g |
| $P_2O_5$ | 16.2 g |
| MgO | 0.3 g |
| $SiO_2$ | 0.3 g |
| SrO | 0.2 g |
| ZnO | 0.022 g |
| $B_2O_3$ | 2.1 g |
| $K_2O$ | 1.5 g |
| $Na_2O$ | 12.51 g |

TABLE 6

| | |
|---|---|
| $Eu_2O_3$ | 0.85 g |
| $Gd_2O_3$ | 2.33 g |
| $CeO_2$ | 0.64 g |
| $Y_2O_3$ | 16.53 g |
| $La_2O_3$ | 0.21 g |
| $Tb_4O_7$ | 0.42 g |
| Total | 20.98 g |

The overall yield for the rare-earth elements is 84.1%.

The invention claimed is:

1. A method of recovering salts of rare-earth elements from a solid mixture comprising at least one halophosphate and at least one compound of one or more rare-earth elements, wherein the method comprises the following steps:
   (a) carrying out acid attack on said mixture in a liquid medium;
   (b) adding a base to the medium obtained at the end of step (a) so as to raise the pH of said medium to a value of at least 1.5, whereby a first solid phase is obtained comprising one or more rare-earth elements at least partly in the form of phosphate and a first liquid phase comprising at least one alkaline-earth element of halophosphate and separating a first solid phase from the first liquid phase;
   (c) attacking the first solid phase resulting from step (b) with a strong base, whereby a second solid phase is obtained comprising one or more rare-earth elements at least in the form of hydroxide and a second liquid phase comprising a phosphate of a cation of the strong base and separating the second solid phase from a second liquid phase;
   (d) carrying out acid attack on the second solid phase resulting from step (c) under conditions such that the pH is below 3, whereby a third solid phase is obtained and a third liquid phase comprising at least one rare-earth salt and separating the third solid phase from the third liquid phase;
   (e) mixing the third solid phase resulting from step (d) with a solid alkaline compound and calcining the mixture thus obtained;
   (f) redispersing, in water, the calcined product resulting from the preceding step;
   (g) separating, from the dispersion obtained at the end of the preceding step, a fourth solid phase comprising one or more rare-earth elements at least in the form of hydroxide and a fourth liquid phase comprising at least one alkaline element;
   (h) preparing an aqueous dispersion of the fourth solid phase resulting from the preceding step and acidifying the dispersion thus obtained; and
   (i) separating, from the dispersion obtained at the end of the preceding step, a fifth solid phase and a fifth liquid phase comprising at least one rare-earth salt.

2. The method as claimed in claim 1, wherein the solid mixture comprises, as a compound of a rare-earth element, a compound of phosphates, alkaline-earth aluminates, borates, vanadates or oxides.

3. The method as claimed in claim 1, wherein the acid attack in step (a) is carried out with nitric acid or hydrochloric acid.

4. The method as claimed in claim 1, wherein step (c) is carried out at a temperature of at least 100° C.

5. The method as claimed in claim 2, wherein the solid mixture comprises an alkaline-earth aluminate.

6. The method as claimed in claim 1, wherein after the acid attack in step (d) or the acidification, in step (h), the medium obtained at the end of these steps is heated, or is submitted to autoclaving.

7. The method as claimed in claim 1, wherein the acid attack in step (d) or the acidification in step (h) is carried out with nitric acid or hydrochloric acid.

8. The method as claimed in claim 1, wherein the aforementioned first and second liquid phases and the fourth liquid phase are mixed together and the pH of the mixture thus obtained is adjusted to at least 5, whereby a precipitate is obtained in a sixth liquid phase, then the precipitate is separated from said sixth liquid phase.

9. The method as claimed in claim 8, wherein the acid attack in step (a) is performed with hydrochloric acid, step (c) is performed with a solution of soda and, step (e) is performed, with a sodium compound, whereby a precipitate comprising a hydroxyapatite and the sixth liquid phase comprising sodium chloride are obtained.

10. The method as claimed in claim 6, wherein the medium obtained at the end of steps (d) or (h) is heated to boiling.

* * * * *